US012566104B2

(12) United States Patent (10) Patent No.: US 12,566,104 B2
Chen (45) Date of Patent: Mar. 3, 2026

(54) LENS TESTING EQUIPMENT

(71) Applicant: VIZIONFOCUS INC., Miaoli County (TW)

(72) Inventor: Chun Chen, Miaoli County (TW)

(73) Assignee: VIZIONFOCUS INC., Miaoli County (TW)

( * ) Notice: Subject to any disclaimer, the term of this patent is extended or adjusted under 35 U.S.C. 154(b) by 171 days.

(21) Appl. No.: 18/233,894

(22) Filed: Aug. 15, 2023

(65) Prior Publication Data

US 2024/0280434 A1 Aug. 22, 2024

(30) Foreign Application Priority Data

Feb. 22, 2023 (TW) .................................. 112106371

(51) Int. Cl.
 G01M 11/02 (2006.01)
(52) U.S. Cl.
 CPC ................................ G01M 11/0257 (2013.01)
(58) Field of Classification Search
 CPC .................................................. G01M 11/0257
 USPC .................................................. 356/124, 138
 See application file for complete search history.

(56) References Cited

U.S. PATENT DOCUMENTS

2006/0238747 A1* 10/2006 Koest ................. G01M 11/0228
 356/124
2006/0238748 A1* 10/2006 Koest ................. G01M 11/0228
 356/124
2015/0300912 A1* 10/2015 Allione .............. G01M 11/0285
 356/124.5
2019/0257714 A1* 8/2019 Schneider .......... G01M 11/0285
2019/0319430 A1* 10/2019 Na ........................ G03B 21/001
2019/0383601 A1* 12/2019 Kwon .................... G01B 11/22
2019/0391040 A2* 12/2019 Gamliel .............. G01M 11/025
2022/0178787 A1* 6/2022 Mohamed .......... G01M 11/0278

FOREIGN PATENT DOCUMENTS

CN 104870967 A 8/2015
CN 211374003 U * 8/2020 ............ G01M 11/02
CN 216410606 U 4/2022
JP H0961291 A 3/1997

* cited by examiner

*Primary Examiner* — Isiaka O Akanbi

(57) ABSTRACT

The present invention provides lens testing equipment including a light source module, wherein the light source module includes a light guide mask and a light-emitting assembly. The light guide mask includes a light-transmitting plate body and a light-shielding pattern layer, wherein the light-shielding pattern layer is configured on the light-transmitting plate body, the light-shielding pattern layer includes multiple light-shielding line segments, and light-transmitting regions are formed among the light-shielding line segments. The light-emitting assembly is adapted to provide a light beam to pass through the light-transmitting regions of the light guide mask. The lens testing equipment of the present invention makes lens testing easier, and the lens testing equipment is simple in structure and easy to produce and has the advantage of low cost.

9 Claims, 3 Drawing Sheets

1

100

LENS TESTING EQUIPMENT

CROSS-REFERENCE TO RELATED APPLICATION

This application claims the priority benefit of Taiwan Application No. 112106371, filed on Feb. 22, 2023. The entirety of the above-mentioned patent application is hereby incorporated by reference herein and made a part of this specification.

FIELD OF THE INVENTION

The present invention relates to a testing equipment, and more particularly to a lens testing equipment.

BACKGROUND OF THE INVENTION

In recent years, in addition to being used for vision correction, contact lenses have been developed to meet consumer needs with various colors and patterns printed on them, which can make pupils look bigger and more aesthetically pleasing. In order to avoid ink in the contact lenses from fading and falling directly onto eyeballs, a transparent layer is applied on the ink to provide protection. In a manufacturing process of the transparent layer, the transparent layer is directly printed on a contact lens mold, and the quality of the transparent layer is tested regularly by a tester during production to confirm whether the thickness, shape and size meet the specifications, so as not to affect the wearing comfort and the function of protecting ink of the contact lenses.

However, due to the need to use an expensive and bulky optical projector for conventional testing of the transparent layer, the tester needs to test outside a production line. Due to the single direction of a light source of the optical projector, for the three-dimensional arc-shaped transparent layer, it is necessary to adjust the angle according to situations in order to observe the imaging of various parts of the transparent layer. Therefore, the above testing way is complex and there is a difference in the reproducibility of the tester.

SUMMARY OF THE INVENTION

The present invention provides a lens testing equipment, so that lens testing can be easier, and the lens testing equipment is simple in structure and easy to produce and has the advantage of low cost.

The lens testing equipment provided by the present invention includes a light source module, wherein the light source module includes a light guide mask and a light-emitting assembly. The light guide mask includes a light-transmitting plate body and a light-shielding pattern layer, wherein the light-shielding pattern layer is configured on the light-transmitting plate body, the light-shielding pattern layer includes multiple light-shielding line segments, and light-transmitting regions are formed among the light-shielding line segments. The light-emitting assembly is adapted to provide a light beam to pass through the light-transmitting regions of the light guide mask.

In an embodiment of the present invention, the light-shielding line segments radially extend outward from a center.

In an embodiment of the present invention, an included angle between any two adjacent light-shielding line segments of the light-shielding line segments is 5-15 degrees, and a width of each of the light-shielding line segments is 0.3-0.7 mm.

In an embodiment of the present invention, the light source module further includes a box body, wherein the box body has a bottom and an opening that are opposite to each other, the light guide mask is disposed at the opening, and the light-emitting assembly is disposed at the bottom.

In an embodiment of the present invention, multiple bearing seats are disposed in the box body, and the light guide mask is disposed on the bearing seats.

In an embodiment of the present invention, each of the bearing seats is provided with a first positioning part, the light guide mask is provided with multiple second positioning parts, and the second positioning parts correspond to the first positioning parts of the bearing seats.

In an embodiment of the present invention, the lens testing equipment further includes multiple fixing assemblies, wherein the first positioning parts and the second positioning parts are positioning holes respectively, and the fixing assemblies pass through the first positioning parts and the second positioning parts.

In an embodiment of the present invention, the light-emitting assembly includes multiple light-emitting diodes arranged in arrays.

In an embodiment of the present invention, the lens testing equipment further includes a carrier, wherein the carrier has a bottom wall and a top wall that are opposite to each other, the light source module is configured on the bottom wall, the top wall has a lens setting opening, and the lens setting opening is opposite to the light-shielding pattern layer.

In an embodiment of the present invention, the lens testing equipment further includes an observation assembly configured on one side, away from the bottom wall, of the lens setting opening.

According to the lens testing equipment provided by the present invention, the light guide mask has the light-shielding pattern layer, and a bright and dark pattern is formed when a light beam is projected onto a lens to be tested, so that the visual contrast is improved. In this way, lens testing can be easier, and the lens testing equipment is simple in structure and easy to produce and has the advantages of low cost.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
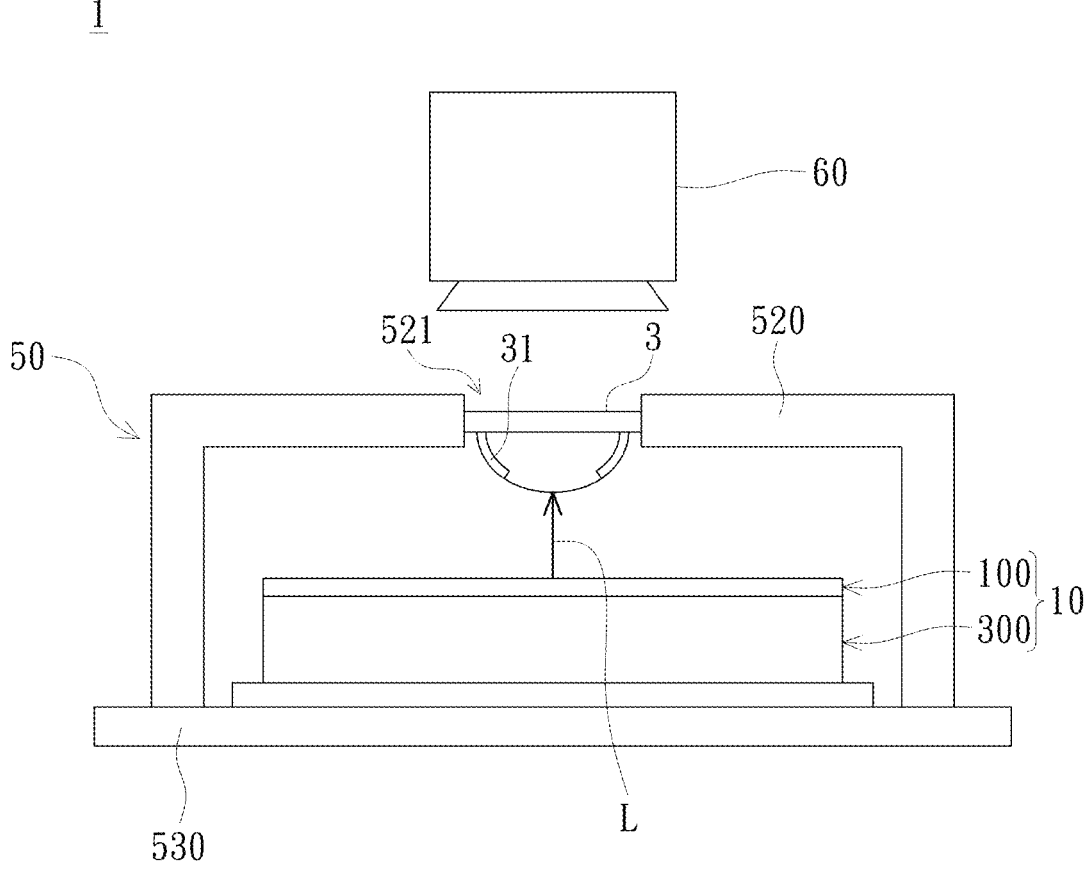
FIG. 1 is a schematic diagram of lens testing equipment according to an embodiment of the present invention.
Figure 2:
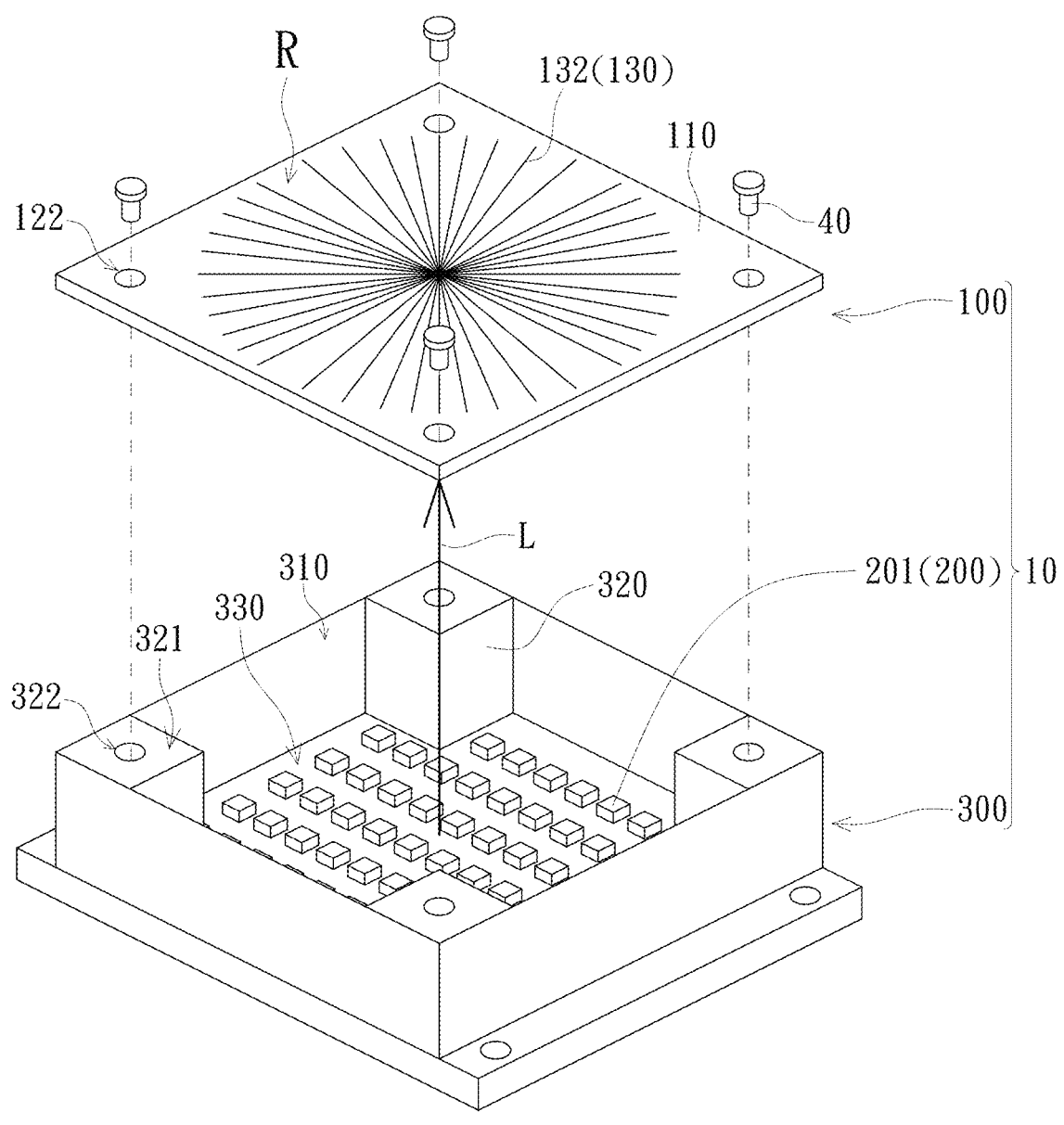
FIG. 2 is an exploded perspective view of a light source module of lens testing equipment according to an embodiment of the present invention.
Figure 3:
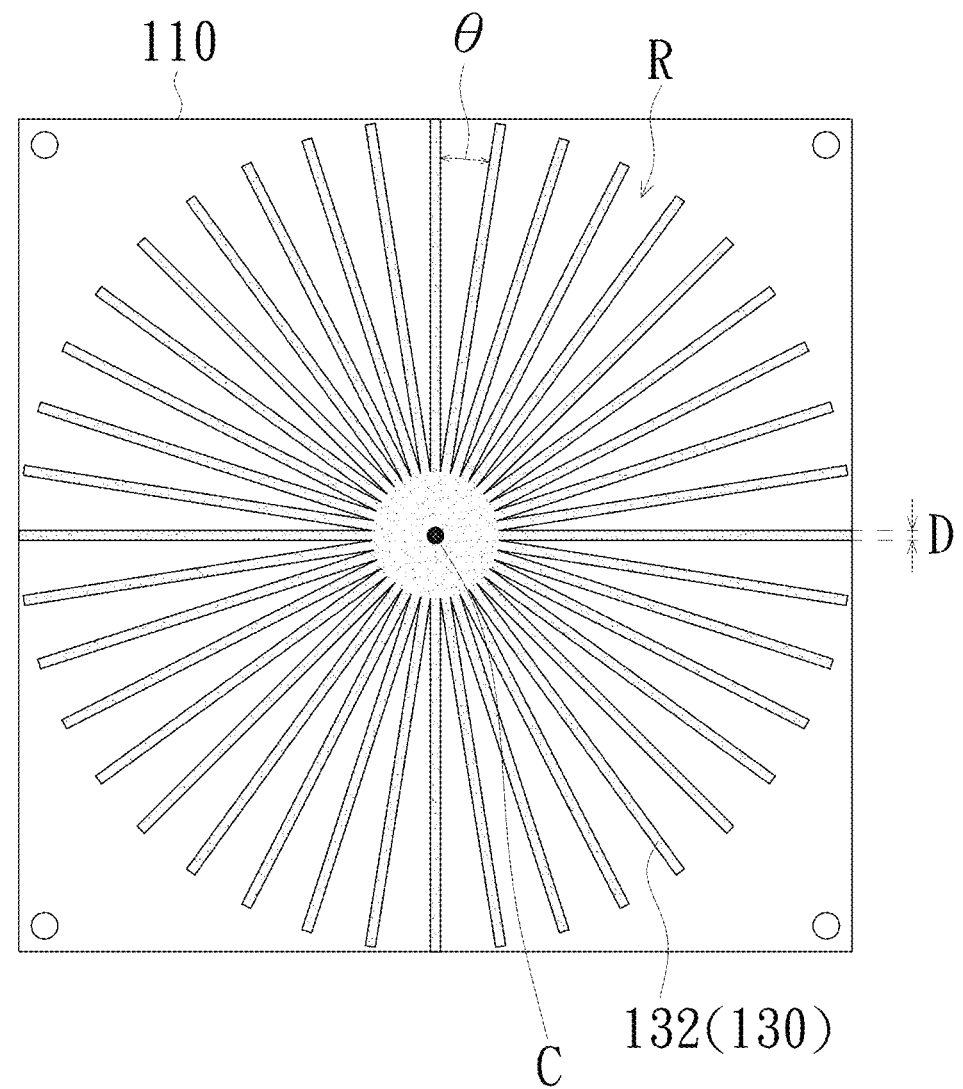
FIG. 3 is a schematic top view of a light guide mask according to an embodiment of the present invention.

FIG. 1 is a schematic diagram of lens testing equipment according to an embodiment of the present invention. FIG. 2 is an exploded perspective view of a light source module of lens testing equipment according to an embodiment of the present invention. FIG. 3 is a schematic top view of a light guide mask according to an embodiment of the present invention. With reference to FIG. 1 and FIG. 3, lens testing equipment 1 of this embodiment includes a light source module 10, wherein the light source module 10 includes a light guide mask 100 and a light-emitting assembly 200. The light guide mask 100 includes a light-transmitting plate body 110 and a light-shielding pattern layer 130, wherein the light-shielding pattern layer 130 is configured on the light-transmitting plate body 110, the light-shielding pattern layer 130 includes multiple light-shielding line segments 132, and light-transmitting regions R are formed among the light-shielding line segments 132. The light-emitting assembly 200 is adapted to provide a light beam L to pass through the light-transmitting regions R of the light guide mask 100.

A material of the light-transmitting plate body 110 of the light guide mask 100 in this embodiment may be light-transmitting acrylic, or may also be a material that can be used as a transparent slide, such as glass, polyethylene terephthalate or the like. The light guide mask 100 of this embodiment features, for example, by printing the light-shielding pattern layer 130 onto the light-transmitting plate body 110 using dark ink difficult to transmit light, but the present invention is not limited thereto. The light-shielding line segments 132 of this embodiment radially extend outward from, for example, a center C, wherein an included angle θ between any two adjacent light-shielding line segments of the light-shielding line segments 132 is, for example, 5-15 degrees, and a width D of each of the light-shielding line segments 132 is, for example, 0.3-0.7 mm, but the present invention is not limited thereto. In an embodiment, the included angle θ is, for example, 9 degrees and the width D is, for example, 0.5 mm. In this embodiment, each of the light-shielding line segments 132 is, for example, a continuous line segment and connected with the center C, and extends outward from the center C in a straight line direction, and lengths of the light-shielding line segments 132 are, for example, the same, so that the light-shielding pattern layer 130 is in a circular outline.

A distribution of the light-shielding line segments 132 of the present invention is not limited to the described above. In another embodiment, each of the light-shielding line segments 132 may have multiple parts arranged in a straight line direction, or some of the light-shielding line segments 132 may have multiple parts arranged in the straight line direction, and the light-shielding line segments 132 are not limited to being connected with the center C, the lengths of the light-shielding line segments 132 are not limited to being equal, and the light-shielding line segments are not limited to extending in the straight line direction. In addition, the angle θ between any two light-shielding line segments 132 may be different.

The lens testing equipment 1 of this embodiment tests a lens to be tested, such as a transparent layer 31 of a contact lens, wherein the transparent layer 31 is carried in a contact lens mold 3, for example. In detail, when a contact lens with an ink layer is needed to be manufactured, for example, the transparent layer 31 is first formed in the contact lens mold 3, and then the ink layer and a lens layer are formed sequentially, to prevent the ink layer in the contact lens from fading and falling off. In this embodiment, when the transparent layer 31 is tested using the lens testing equipment 1, the light-shielding pattern layer 130 provided on the light-transmitting plate body 110 can shield light, the light beam L transmitted to the light-shielding pattern layer 130 cannot penetrate the light-transmitting plate body 110, but the light beam L transmitted to the light-transmitting regions R can penetrate the light-transmitting plate body 110. Therefore, when the light beam L penetrates the light guide mask 100 and is projected onto the transparent layer 31, a bright and dark pattern can be formed.

In order to facilitate fixing the contact lens mold 3, the lens testing equipment 1 of this embodiment further includes, for example, a carrier 50, wherein the carrier 50 has a bottom wall 530 and a top wall 520 that are opposite to each other, the light source module 10 is, for example, configured on the bottom wall 530. The top wall 520 has, for example, a lens setting opening 521, the lens setting opening 521, for example, is opposite to the light-shielding pattern layer 130, and the lens setting opening 521 can be used for the placement of the contact lens mold 3. When the contact lens mold 3 is placed in the lens setting opening 521, a hemisphere exists, for example, on a side close to the light source module 10, the transparent layer 31 is adapted to be carried in the hemisphere, and the transparent layer 31 is, for example, circular. It is be noted that the light source module 10 of this embodiment is, for example, disposed in the carrier 50; in other words, the light beam L can only be transmitted to the outside of the carrier 50 through the lens setting opening 521 of the carrier 50, to prevent the light from outside the light source module 10 from irradiating the transparent layer 31, such that the visual contrast can be clearer when the light beam L is projected onto the transparent layer 31 and testing of the quality of the transparent layer 31 is facilitated; however, the present invention is not specifically limited thereto.

In addition, the lens testing equipment 1 further includes an observation assembly 60, for example, which is configured on a side, away from the bottom wall 530, of the lens setting opening 521. When the bright and dark pattern formed by the light beam L of the light source module 10 is projected onto the transparent layer 31, after an image of the transparent layer 31 is captured by the observation assembly 60, the quality of the transparent layer 31 may be judged by virtue of the image, so that a testing process of the transparent layer 31 is easier. In this embodiment, the observation assembly 60 is, for example, a camera, a projector, a magnifying glass or the like, which facilitates observing the transparent layer 31. In another embodiment, the lens testing equipment 1 may not include the observation assembly 60, so that a tester can directly observe the transparent layer 31 with naked eyes, but the present invention is not limited thereto.

Referring to FIG. 2, the light source module 10 of this embodiment further includes, for example, a box body 300, the box body 300 has, for example, a bottom 330 and an opening 310 that are opposite to each other. The light guide mask 100 is, for example, disposed on the opening 310, and the light-emitting assembly 200 is, for example, disposed at the bottom 330. For example, multiple bearing seats 320 are disposed in the box body 300, and the light guide mask 100 is disposed on the bearing seats 320. Specifically, the shapes of the opening 310 and the bottom 330 of the box body 300 in this embodiment, for example, correspond to the shape of the light guide mask 100 and all are square. The box body 300 has, for example, four bearing seats 320 disposed at four corners of the square, so that the four bearing seats 320 may stably bear the light guide mask 100; and the present invention does not limit the number and setting positions of the bearing seats 320 of the box body 300. In addition, the light-emitting assembly 200 of this embodiment includes, for example, multiple light-emitting diodes 201 arranged in arrays. In other embodiments, the light-emitting diodes 201 may also be replaced by other types of light-emitting components The light-emitting diodes 201 are not limited to array arrangement.

Each of the bearing seats 320 is provided with, for example, a first positioning part 322, and the light guide mask 100 has, for example, multiple second positioning parts 122, the second positioning parts 122, for example, correspond to the first positioning parts 322 of the bearing seats 320. For example, the lens testing equipment 1 further includes multiple fixing assemblies 40, wherein the first positioning parts 322 and the second positioning parts 122 are positioning holes respectively, and the fixing assemblies 40 pass through the first positioning parts 322 and the second positioning parts 122, for example. In this embodiment, each of the bearing seats 320 is provided with, for example, the first positioning part 322 on a top surface 321 away from the bottom 330, and the light guide mask 100 has, for example, second positioning parts 122 at four corners. The second positioning parts 122 correspond to the first positioning parts 322 of the bearing seats, each of the first positioning parts 322 and each of the second positioning parts 122 may be positioning holes, and the fixing assemblies 40 respectively pass through the second positioning parts 122 and the corresponding first positioning parts 322 to fix the light guide mask 100 onto the box body 300. The fixing assembly 40 is, for example, a screw, a fixing way between the fixing assembly 40, and the first positioning part 322 and the second positioning part 122 is a locking way, for example, but the present invention neither specifically limits that the first positioning part 322 and the second positioning part 122 need to be positioning holes, nor limit the fixing way between the fixing assembly 40, the first positioning part 322 and the second positioning part 122. In addition, in the present invention, the number of the first positioning parts 322 of the bearing seat 320 and the number of the second positioning parts 122 of the light guide mask 100 are not specifically limited, but it is to be noted that the number and setting positions of the first positioning parts 322 and the second positioning parts 122 may correspond to the number and setting positions of the fixing assemblies 40, so that the light guide mask 100 may be firmly fixed on the box body 300. In another embodiment, the first positioning parts 322 and the second positioning parts 122 may be fixed by being clamped to each other (for example, in a manner that positioning holes and positioning columns are combined), so that no fixing assembly 40 is needed.

In this embodiment, when the light beam L penetrates the light guide mask 100 and is projected onto the lens to be tested (for example, the transparent layer 31), a bright and dark pattern can be formed. In this way, a visual contrast effect of the light beam L when imaging on the solid arc-shaped transparent layer 31 can be improved, and the quality of the transparent layer 31 can be tested without rotating and adjusting the angle during the testing of the quality of the transparent layer 31, so that the testing is more convenient, and a testing result can be reproduced since rotating and adjusting the angle is unnecessary. Although the lens testing equipment 1 in this embodiment is used to test the transparent layer 31 of the contact lens, for example, the present invention does not limit a testing object of the lens testing equipment 1. In addition, the lens testing equipment 1 provided by the present invention has lower production cost compared with a conventional optical projector of a testing instrument, and has the advantage of small size.

To sum up, the light-shielding pattern layer of the lens testing equipment provided by the present invention can form the bright and dark pattern when the light beam is projected onto the lens to be tested, so that the visual contrast is improved and the testing of the quality of the transparent layer is facilitated; and the lens testing equipment is simple in structure and easy to produce and has the advantage of low cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. Lens testing equipment, comprising:
a light source module comprising:
a light guide mask comprising a light-transmitting plate body and a light-shielding pattern layer, wherein the light-shielding pattern layer is configured on the light-transmitting plate body and comprises multiple light-shielding line segments, and light-transmitting regions are formed among the light-shielding line segments; and
a light-emitting assembly adapted to provide a light beam to pass through the light-transmitting regions of the light guide mask;
wherein the light-shielding line segments radially extend outward from a center, and each of the light-shielding line segments is a continuous line segment;
wherein an included angle between any two adjacent light-shielding line segments of the light-shielding line segments is 5-15 degrees, and a width of each of the light-shielding line segments is 0.3-0.7 mm.

2. The lens testing equipment according to claim 1, wherein the light source module further comprises a box body, the box body has a bottom and an opening that are opposite to each other, the light guide mask is disposed at the opening, and the light-emitting assembly is disposed at the bottom.

3. The lens testing equipment according to claim 2, wherein multiple bearing seats are disposed in the box body, and the light guide mask is disposed on the bearing seats.

4. The lens testing equipment according to claim 3, wherein each of the bearing seats is provided with a first positioning part, the light guide mask has multiple second positioning parts, and the second positioning parts correspond to the first positioning parts of the bearing seats.

5. The lens testing equipment according to claim 4, further comprising multiple fixing assemblies, wherein the first positioning parts and the second positioning parts are positioning holes respectively, and the fixing assemblies pass through the first positioning parts and the second positioning parts.

6. The lens testing equipment according to claim 1, wherein the light-emitting assembly comprises multiple light-emitting diodes arranged in arrays.

7. The lens testing equipment according to claim 1, further comprising a carrier, wherein the carrier has a bottom wall and a top wall that are opposite to each other, the light source module is configured on the bottom wall, the top wall has a lens setting opening, and the lens setting opening is opposite to the light-shielding pattern layer.

8. The lens testing equipment according to claim 7, further comprising an observation assembly configured on a side, away from the bottom wall, of the lens setting opening.

9. The lens testing equipment according to claim 1, wherein lengths of the light-shielding line segments are the same, and the light-shielding pattern layer is in a circular outline.

\* \* \* \* \*